May 18, 1926.
A. R. THOMSON
TOOL HOLDER
Filed July 5, 1924
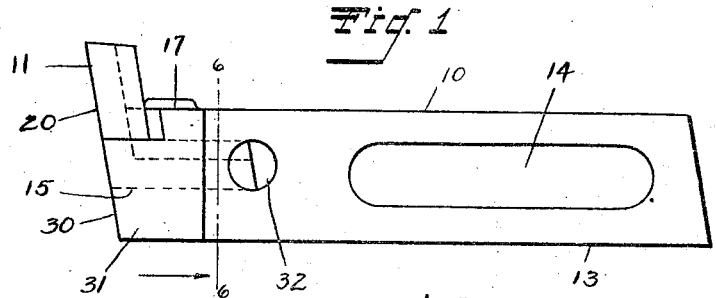
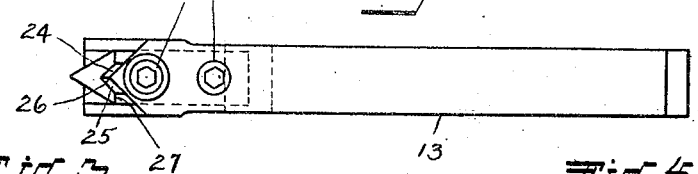
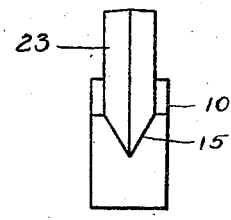
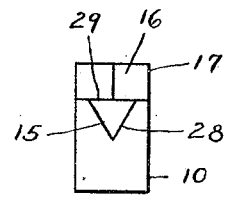
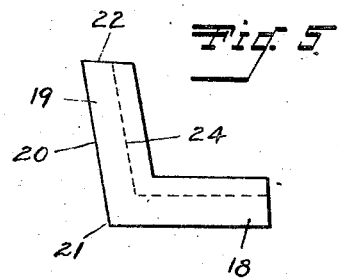
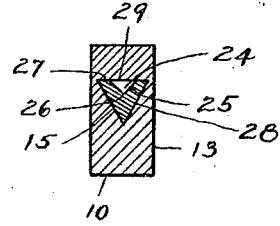
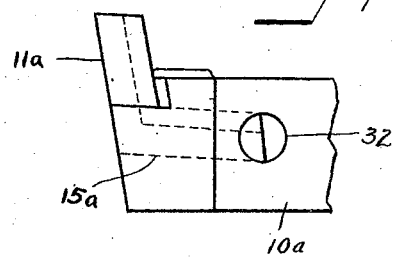
Inventor:
Albert R. Thomson
Louis M. Schmidt
Atty.

Patented May 18, 1926.

1,585,000

UNITED STATES PATENT OFFICE.

ALBERT R. THOMSON, OF DERBY, CONNECTICUT.

TOOL HOLDER.

Application filed July 5, 1924. Serial No. 724,467.

My invention relates to improvements in tool holders, of the form that is used to hold a cutter for lathe work and the object of my improvement is to produce a combination of a tool holder and a cutter that are adapted to cooperate one with the other wherein the cutter is of angular form, having two branches that meet at an apex, whereby it is reversible, the two branches being similar or substantially alike, and also, both the tool holder and the cutter are of such form as to be easily and cheaply made, involving as a preliminary operation in forming the unfinished blanks the use of drop forging.

In the accompanying drawing:—

Figure 1 is a side elevation of a tool holder and cutter embodying my invention.

Figure 2 is a plan view of the same.

Figure 3 is an end elevation of the same.

Figure 4 is an end elevation of the tool holder only.

Figure 5 is a side elevation of the cutter.

Figure 6 is a sectional view on the line 6—6 of Fig. 1.

Figure 7 is a side elevation of the end portion of a tool holder, showing a modification of the same and a cutter to correspond therewith.

My improved tool-holder and cutter combination comprises a tool-holder 10 and a cutter 11 that are adapted to cooperate with one another in a special manner, a pair of screws 12, as shown, serving to hold them together.

The holder 10 has an elongated shank 13 that has the middle portion 14 depressed to provide an I-beam form for the cross-section, the holder being made by the drop forging process. At the forward end for cooperating with the cutter 11 there is provided a longitudinally directed slot or socket 15 and the end face 16 of the portion 17 of the holder 10 that is above said socket 15 is finished to serve as a seat.

The cutter 11 is in the form of a two-branch structure, comprising under conditions of use a longitudinally directed branch 18 and an upwardly directed branch 19 at the forward end of said longitudinally directed branch 18. The outer edges of said branches 18 and 19 meet at the vertex 21, said edges being denoted by the character 20. The upper end face 22 of the upper branch or upwardly directed branch 19 is finished off approximately in parallelism with the axis of the longitudinally directed branch 18 to provide the cutting edge or edges, the exact form or shape being determined in accordance with the particular work for which the tool is to be used.

Said upwardly directed branch 19 may be designated as the active or cutter-branch and the longitudinally directed branch 18 may be designated as the holding or positioning branch, the latter being the one that is engaged by the holding screws 12. Said screws 12 are located in alignment and in spaced relation.

The angle formed by the two branches 18 and 19 I prefer to make slightly greater than a right-angle, the degree of obtuseness depending upon the nature of the work for which the tool is to be used. As shown, assuming the holding branch 18 to be horizontal, the deviation of the active branch 19 from the vertical is approximately five degrees.

As a detail, the two branches 18 and 19 are made similar in every way, including the cross-section, which is special as will be described. Thus the two branches 18 and 19 are interchangeable and the cutter 11 is reversible for use of either as the active branch.

It is common in the case of an active cutter such as the active branch 19 to have the forward portion of the cross-section of V-shape and this is the shape used in the present instance, said forward portion of the cross-section being defined by the two flat sides 23 that meet along the forward edge 20. The angle between the sides 23 may be about sixty degrees.

The rear side of the cross-section referred to is in the form of a depression or groove 24 along the middle, as defined by the flat sides 25 that meet at the middle at the vertex 26. Said groove 24 is of appreciable depth and may be bordered, as shown, on each side by relatively short transverse portions 27. The angle between the flat sides 25 of the groove 24 may be approximately ninety degrees.

Bearing in mind the fact that the two branches are similar, the socket 15 is of V-shape for the cross-section to fit against the forward flat sides 23, the sides 28 converging downwardly at an angle of sixty degrees. The roof 29 is flat to fit against the laterally positioned short transverse portions 27. As described, the holding branch 18 bottoms in the groove 15.

In the case of the active branch 19 the ninety degree groove 24 serves as a seat in cooperation with the seat 16 already mentioned, said seat 16 being of V-shape to correspond. Said end face seat 16 may be, as shown, stepped back from the forward end for approximately the thickness of the cutter so that the forward edge 30 of the lower portion 31 of the holder 10 may be substantially flush with the forward edge 20 of the cutter.

The socket 15 in the holder is formed by broaching and to facilitate so doing the holder 10 is provided with a transverse opening 32 of appreciable diameter at the inner end of said socket 15.

The cutter 11 shown and described is adapted to be made by the drop forging process.

The transverse opening 32 is positioned so as to provide for access to the tool to facilitate the removal thereof.

In the modification shown in Fig. 7 the socket 15ª in the holder 10ª is inclined downwardly from the horizontal or the axial line and the angle between the two branches of the cutter 11ª is increased to correspond.

I claim as my invention:—

1. A tool-holder and cutter combination comprising a tool-holder having a socket entering longitudinally from one end and a seat on the end face above said socket, and a cutter of angular form having one branch for entering said socket and a second branch for lying against said seat.

2. A tool-holder and cutter combination as described in claim 1, said branches being similar and reversible as to use.

3. A tool-holder and cutter combination as described in claim 1, said seat being in the form of an angular ridge, and the portion of said cutter that cooperates with said seat being shaped to correspond to said ridge.

4. A combination as described in claim 1, the angle defined by said branches being slightly obtuse.

5. In a tool-holder and cutter combination for lathe work, a cutter having the end face and the forward portion of the cross-section shaped to provide a cutting edge, the rear portion of said cross-section being of angular formation, and a tool-holder for supporting said cutter, said tool-holder having a seat that is opposed to rear portion of the cross-section, and said seat being shaped to correspond to that of said rear portion of the cross-section.

6. A tool-holder having a socket for a tool that enters longitudinally from one end, and the bottom bearing wall of said socket being formed by faces that meet in V-formation, and being of uniform cross-section from end to end.

ALBERT R. THOMSON.